(12) United States Patent
Kang et al.

(10) Patent No.: US 11,169,700 B2
(45) Date of Patent: Nov. 9, 2021

(54) ELECTRONIC DEVICE AND CONTROL METHOD THEREOF

(71) Applicant: SAMSUNG ELECTRONICS CO., LTD., Suwon-si (KR)

(72) Inventors: Jeannie Kang, Seoul (KR); Dong-hyuk Kim, Yongin-si (KR); Soo-ah Kim, Seoul (KR); Yong-ku Kim, Seoul (KR); So-jeong Park, Suwon-si (KR); Hyeon-seung Bae, Icheon-si (KR); Dong-hee Won, Seoul (KR); Sung-hye Lee, Seoul (KR); Jae-kwang Lee, Hwaseong-si (KR); Hyun-ho Choi, Bucheon-si (KR); Young-ran Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/108,820

(22) Filed: Aug. 22, 2018

(65) Prior Publication Data

US 2019/0065047 A1 Feb. 28, 2019

(30) Foreign Application Priority Data

Aug. 22, 2017 (KR) ........................ 10-2017-0106056
Aug. 17, 2018 (KR) ........................ 10-2018-0096099

(51) Int. Cl.
*G06F 3/0488* (2013.01)
*G06F 3/0485* (2013.01)
*G06F 3/0483* (2013.01)

(52) U.S. Cl.
CPC ........ *G06F 3/04886* (2013.01); *G06F 3/0483* (2013.01); *G06F 3/0485* (2013.01);
(Continued)

(58) Field of Classification Search
CPC ............ G06F 3/04886; G06F 3/04883; G06F 3/0485; G06F 3/04855; G06F 3/0483; G06F 2203/04803; G06F 2200/1614
See application file for complete search history.

(56) References Cited

U.S. PATENT DOCUMENTS 5,771,032 A * 6/1998 Cline .................... G06F 3/0485
345/622
7,827,314 B2 11/2010 Gibbs et al.
(Continued)

FOREIGN PATENT DOCUMENTS

CN 103207724 A 7/2013
JP 3-228115 A 10/1991
(Continued)

OTHER PUBLICATIONS

Communication dated Jan. 4, 2019, from the European Patent Office in counterpart European Application No. 18190096.0.
(Continued)

*Primary Examiner* — Jose R Soto Lopez
(74) *Attorney, Agent, or Firm* — Sughrue Mion, PLLC

(57) ABSTRACT

An electronic device and a control method thereof are provided. The control method of the electronic device includes displaying at least one page from among a plurality of pages, detecting a touch drag input while the at least one page is displayed, performing a scroll function with respect to the plurality of pages according to the touch drag input based on a start point of the touch drag input being positioned in a first area, and performing a drawing function according to the touch drag input based on the start point of the touch drag input being positioned in a second area.

20 Claims, 14 Drawing Sheets

(52) U.S. Cl.
CPC ...... *G06F 3/04855* (2013.01); *G06F 3/04883* (2013.01); *G06F 2203/04803* (2013.01)

(56) References Cited

U.S. PATENT DOCUMENTS

| | | | |
|---|---|---|---|
| 9,535,597 B2* | 1/2017 | Wong | G06F 3/04886 |
| 10,082,943 B2* | 9/2018 | Kim | G06F 3/0485 |
| 10,185,484 B2* | 1/2019 | Hwang | G06F 3/04886 |
| 10,254,942 B2* | 4/2019 | Vranjes | G06F 3/04847 |
| 10,303,325 B2* | 5/2019 | Jarrett | G06F 3/04842 |
| 10,678,412 B2* | 6/2020 | Vranjes | G06F 3/04842 |
| 2007/0220431 A1 | 9/2007 | Nakamura et al. | |
| 2008/0122796 A1 | 5/2008 | Jobs et al. | |
| 2008/0126967 A1 | 5/2008 | Lusen et al. | |
| 2010/0022276 A1* | 1/2010 | Park | G06F 3/04892 |
| | | | 455/566 |
| 2010/0066763 A1* | 3/2010 | Macdougall | G06F 1/1626 |
| | | | 345/656 |
| 2011/0074699 A1* | 3/2011 | Marr | G06F 3/04817 |
| | | | 345/173 |
| 2012/0096393 A1* | 4/2012 | Shim | G06F 3/0485 |
| | | | 715/784 |
| 2012/0240041 A1 | 9/2012 | Lim et al. | |
| 2013/0031507 A1 | 1/2013 | George | |
| 2013/0063362 A1 | 3/2013 | Papakipos et al. | |
| 2014/0139471 A1 | 5/2014 | Matsuki | |
| 2014/0208277 A1* | 7/2014 | Makino | G06F 3/0485 |
| | | | 715/863 |
| 2014/0351698 A1 | 11/2014 | Nakagawa | |
| 2015/0007102 A1 | 1/2015 | Choi et al. | |
| 2015/0160794 A1* | 6/2015 | Huang | G06F 3/0488 |
| | | | 715/810 |
| 2016/0196057 A1* | 7/2016 | Choi | G06F 3/04883 |
| | | | 715/773 |
| 2016/0202852 A1* | 7/2016 | Park | G06F 3/04845 |
| | | | 715/781 |
| 2016/0202865 A1* | 7/2016 | Dakin | G06F 3/0485 |
| | | | 715/784 |
| 2016/0261788 A1* | 9/2016 | Mizukami | G06F 3/04847 |
| 2016/0274847 A1* | 9/2016 | Suzuki | G06F 3/1256 |
| 2016/0275095 A1* | 9/2016 | Yokoyama | G06F 16/168 |
| 2016/0291848 A1* | 10/2016 | Hall | G06F 3/04883 |
| 2016/0357353 A1 | 12/2016 | Miura et al. | |
| 2017/0060819 A1* | 3/2017 | Rucine | G06K 9/00402 |
| 2017/0060821 A1* | 3/2017 | Rucine | G06K 9/00442 |
| 2017/0075538 A1* | 3/2017 | Park | G06F 3/04883 |
| 2017/0083224 A1* | 3/2017 | Banerjee | G06F 3/0483 |
| 2017/0091153 A1* | 3/2017 | Thimbleby | G06K 9/00402 |
| 2017/0188087 A1* | 6/2017 | Kyoun | G06F 13/14 |
| 2017/0220215 A1* | 8/2017 | Wu | G06F 3/0482 |
| 2017/0220226 A1* | 8/2017 | Wu | G06F 3/04883 |
| 2017/0242568 A1* | 8/2017 | Van Der Westhuizen | G06F 3/04812 |
| 2017/0262148 A1* | 9/2017 | Zhang | G06F 3/0485 |
| 2017/0351395 A1* | 12/2017 | Giannopoulos | G06F 3/04845 |
| 2018/0011597 A1* | 1/2018 | Lee | G06F 3/04186 |
| 2018/0091728 A1* | 3/2018 | Brown | G06F 3/0488 |
| 2018/0321823 A1* | 11/2018 | Huang | G06F 3/04842 |
| 2019/0018581 A1* | 1/2019 | Aronoff | H04M 1/72439 |
| 2019/0087024 A1* | 3/2019 | Kim | G06F 3/0354 |
| 2020/0264770 A1* | 8/2020 | Shen | G06F 3/0484 |

FOREIGN PATENT DOCUMENTS

| | | |
|---|---|---|
| JP | 7-200133 A | 8/1995 |
| JP | 2012-168621 A | 9/2012 |
| JP | 2015-97103 A | 5/2015 |
| KR | 10-1011474 B1 | 1/2011 |
| KR | 10-2012-0109832 A | 10/2012 |
| KR | 10-1398540 B1 | 5/2014 |
| KR | 10-2015-0067117 A | 6/2015 |
| KR | 10-1632638 B1 | 6/2016 |
| WO | 2008/030976 A2 | 3/2008 |

OTHER PUBLICATIONS

International Search Report (PCT/ISA/210), issued by International Searching Authority in corresponding International Application No. PCT/KR2018/009668, dated Nov. 28, 2018.

Written Opinion (PCT/ISA/237) issued by the International Searching Authority in corresponding International Application No. PCT/KR2018/009668, dated Nov. 28, 2018.

Fitzmaurice, George W. et al., "An Exploration into Supporting Artwork Orientation in the User Interface", CHI, [CHI Conference Proceedings. Human Factors in Computing Systems], May 15, 1999-May 20, 1999, pp. 167-174, XP058268230. (8 pages total).

Search Report dated May 14, 2020 by the European Patent Office in counterpart European Patent Application No. 20152302.4.

Communication dated Mar. 2, 2021, from the Japanese Patent Office in Application No. 2020-506958.

Okamoto, Koji, "PDF basic reading and oxidized silver short cut, Nikkei PC21", Nikkei Business Publications Inc., Jun. 24, 2015, vol. 20, No. 9, pp. 16 and 134 (5 pages total).

Communication dated Jun. 22, 2021 issued by the Japanese Intellectual Property Office in counterpart Japanese Application No. 2020-506958.

Communication dated Apr. 20, 2021 issued by the Indian Patent Office in counterpart Indian Application No. 202027011664.

* cited by examiner

100

(a)  (b)

ELECTRONIC DEVICE AND CONTROL METHOD THEREOF

CROSS-REFERENCE TO RELATED APPLICATION

This application is based on and claims priority under 35 U.S.C. § 119 to Korean Patent Application No. 10-2017-0106056, filed on Aug. 22, 2017, and Korean Patent Application No. 10-2018-0096099, filed on Aug. 17, 2018, in the Korean Intellectual Property Office, and the disclosure of which is incorporated by reference herein in its entirety.

BACKGROUND

1. Field

Apparatuses and methods consistent with the disclosure relates to an electronic device and a control method thereof, and more particularly, to an electronic device including a display having a large screen and a control method thereof.

2. Description of Related Art

An electronic device having a large screen, such as a related art electronic board, provides a variety of interaction environments according to a user command.

For example, an electronic device may provide an interaction environment which displays a content corresponding to a user command or a drawing image according to a touch drag input of the user on a display on which at least one page is displayed.

In this interaction environment, the electronic device may scroll the at least one page displayed on the display to display the previous or next page according to a user operation regarding a scroll bar displayed on one area of the display.

Further, the electronic device may scroll the at least one page displayed on the display and convert the page to the next page and display it according to a user operation relating to a navigation window managing a plurality of pages displayed on one area of the display.

However, there is a problem that, while a plurality of pages are displayed on the display as being separated from each other, when a page is scrolled according to a user operation, the page is not displayed with continuity on the display.

Accordingly, there is a need for various interaction environments in which a plurality of pages are displayed with continuity compared with an interaction environment provided in a related art electronic device.

SUMMARY

One or more embodiments provide a variety of interaction environments through an electronic device providing a display having a large screen.

In particular, one or more embodiments provide an interaction environment in which a plurality of pages are displayed with continuity through an electronic device providing a display having a large screen.

According to an aspect of the present disclosure, there is provided a method for controlling an electronic device, the method comprising: displaying at least one page, among a plurality of pages; detecting a touch drag input while the at least one page is displayed; performing a scroll function with respect to the plurality of pages according to the touch drag input based on a determination that a start point of the touch drag input is positioned in a first area corresponding to a boundary line between the at least one page and a subsequent page, among the plurality of pages; and performing a drawing function according to the touch drag input based on a determination that the start point of the touch drag input is positioned in a second area.

The displaying may comprise displaying the boundary line for distinguishing between the at least one page from the subsequent page, and the first area may be an area within a predetermined distance from the boundary line.

The displaying may comprise displaying an icon for displaying a navigation window for managing the plurality of pages together with the at least one page, and displaying, based on a user input to select the icon, the navigation window in one area of the display together with the at least one page while the at least one page is displayed.

The navigation window may comprise an indicator for managing at least one page currently displayed, and based on the scroll function being performed, the indicator may be moved according to the scroll function performed.

The indicator may comprise at least one of an icon for moving a page currently displayed, an icon for inserting a new page, and an icon for deleting a page.

The method may further comprising: detecting a rotation of the electronic device while the at least one page and the navigation window are simultaneously displayed; and rotating the navigation window according to the detected rotation of the electronic device while refraining from rotating the at least one page.

The displaying may comprise displaying a scroll pad for scrolling the plurality of pages on a display on which the at least one page is displayed, and scrolling the plurality of pages based on a user command being input through the scroll pad.

The performing may further comprise: identifying a size of an area in which the touch drag input is detected when the start point of the touch drag input is determined to be positioned in the second area; and performing the drawing function according to the touch drag input when the size of the touch area in which the touch drag input is detected is less than or equal to a first threshold.

The performing may further comprise: performing an eraser function according to the touch drag input when a size of the area in which the touch drag input is detected is greater than the first threshold and less than a second threshold; and performing an insert function to insert a predefined image according to the touch drag input when the size of the touch area in which the touch drag input is detected is greater than or equal to the second threshold.

According to another aspect of the present disclosure, there is provided an electronic device, comprising: a display; and a processor configured to: control the display to display at least one page from among a plurality of pages; detect a touch drag input while the at least one page is displayed; perform a scroll function for the plurality of pages according to the touch drag input based on a determination that a start point of the touch drag input is positioned in a first area corresponding to a boundary line between the at least one page and a subsequent page, among the plurality of pages; and perform a drawing function according to the touch drag input based on a determination that the start point of the touch drag input is positioned in a second area.

The processor may be further configured to control the display to display the boundary line for distinguishing between the at least one page from the subsequent page, and the first area may be an area within a predetermined distance from the boundary line.

The processor may be further configured to control the display to display an icon for displaying a navigation window for managing the plurality of pages, and control the display to display, based on a user input to select the icon, the navigation window in one area of the display together with the at least one page while the at least one page is displayed.

The navigation window may include an indicator for managing at least one page currently displayed, and the processor, based on the scroll function being performed, may move the indicator according to the scroll function performed.

The indicator may comprise at least one of an icon for moving a page currently displayed, an icon for inserting a new page, and an icon for deleting a page.

The processor may be further configured to: detect a rotation of the electronic device while the at least one page and the navigation window are simultaneously displayed; and rotate the navigation window according to the detected rotation of the electronic device while refraining from rotating the at least one page.

The processor may be further configured to control the display to display a scroll pad for scrolling the plurality of pages while the at least one page is displayed, and scroll the plurality of pages based on a user command being input through the scroll pad.

The processor may be further configured to: identify a size of an area in which the touch drag input is detected when the start point of the touch drag input is determined to be positioned in the second area; and perform the drawing function according to the touch drag input when the size of the touch area in which the touch drag input is detected is less than or equal to a first threshold.

The processor may be further configured to: perform an eraser function according to the touch drag input when a size of the area in which the touch drag input is detected is greater than the first threshold and less than a second threshold; and perform an insert function to insert a predefined image according to the touch drag input when the size of the touch area in which the touch drag input is detected is greater than or equal to the second threshold.

According to another aspect of the present disclosure, there is provided an electronic board, comprising: a display; and a processor configured to: control the display to display at least one page from among a plurality of pages; detect a touch drag input while the at least one page is displayed; determine whether a start point of the touch drag input is positioned in a first area in the vicinity of a boundary line between the at least one page and a subsequent page, among the plurality of pages or whether the start point of the touch drag input is positioned in a second area, different from the first area; perform a scroll function for the plurality of pages according to the touch drag input based on the determination that the start point of the touch drag input is positioned in the first area in the vicinity of the boundary line; and perform a managing function for managing content within the at least one page, according to the touch drag input based on the determination that the start point of the touch drag input is positioned in a second area, wherein the managing function is at least one of a drawing function to draw within the at least one page, an eraser function to erase within the at least one page, and an insert function to insert a predefined image within the at least one page.

The first area may be within a predetermined distance from the boundary line or the first area may be on the boundary line.

According to another aspect of the present disclosure, there is provided a method for controlling an electronic board, the method comprising: displaying at least one page from among a plurality of pages on a display of the electronic board; detecting a touch drag input while the at least one page is displayed; determining whether a start point of the touch drag input is positioned in a first area in the vicinity of a boundary line between the at least one page and a subsequent page, among the plurality of pages or whether the start point of the touch drag input is positioned in a second area, different from the first area; performing a scroll function for the plurality of pages according to the touch drag input based on the determination that the start point of the touch drag input is positioned in the first area in the vicinity of the boundary line; and performing a managing function for managing content within the at least one page, according to the touch drag input based on the determination that the start point of the touch drag input is positioned in a second area, wherein the managing function is at least one of a drawing function to draw within the at least one page, an eraser function to erase within the at least one page, and an insert function to insert a predefined image within the at least one page.

The first area may be within a predetermined distance from the boundary line or the first area may be on the boundary line According to the various embodiments described above, the electronic device may provide various interaction environments.

BRIEF DESCRIPTION OF THE DRAWINGS

The above and/or other aspects will become more apparent by reference to embodiments which are illustrated in the appended drawings. Understanding that these drawings depict only certain embodiments and are not therefore to be considered to be limiting of the scope of the disclosure, the principles herein are described and explained with additional specificity and detail via the use of the accompanying drawings, in which.

DETAILED DESCRIPTION

Figure 1:
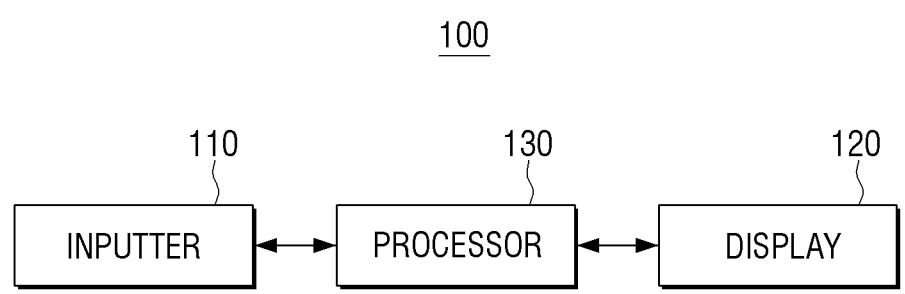
FIG. 1 is a block diagram of an electronic device, according to an embodiment.

Certain embodiments will now be described in greater detail with reference to the accompanying drawings.

The terms used in the embodiments of the present disclosure are general terms which are widely used now and selected considering the functions of the present disclosure. However, the terms may vary depending on the intention of a person skilled in the art, a precedent, or the advent of new technology. In addition, in a special case, terms selected by the applicant may be used. In this case, the meaning of the terms will be explained in detail in the corresponding detailed descriptions. Accordingly, defining the terms used herein will be based on the meanings of the terms and overall contents of exemplary embodiments, rather than simple names of the terms.

As embodiments may have a variety of modifications and several examples, certain embodiments will be exemplified in the drawings and described in detail in the description thereof. However, this does not necessarily limit the scope of the embodiments to a specific embodiment form. Instead, modifications, equivalents and replacements included in the disclosed concept and technical scope of this specification may be employed. While describing embodiments, if it is determined that the specific description regarding a known technology obscures the gist of the disclosure, the specific description is omitted.

In the present disclosure, relational terms such as first and second, and the like, may be used to distinguish one entity from another entity, without necessarily implying any actual relationship or order between such entities. In embodiments of the present disclosure, relational terms such as first and second, and the like, may be used to distinguish one entity from another entity, without necessarily implying any actual relationship or order between such entities.

It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

According to embodiments, a "module" or "unit" performs at least one function or operation, and may be implemented as hardware or software, or a combination of hardware and software. In addition, a plurality of 'modules' or a plurality of 'units' may be integrated into at least one module and may be realized as at least one processor except for 'modules' or 'units' that should be realized in a specific hardware.

Throughout the embodiments, when a certain portion is stated as being "connected" with another, this means that the portion is not only "directly connected", but also "electrically connected" while being intervened by another element in the middle. In addition, it means that a portion is "physically connected" as well as "wirelessly connected". Further, when a certain portion is stated as "comprising" a certain element, unless otherwise stated, this means that the certain portion may include another element, rather than foreclosing the same.

Hereinbelow, certain embodiments will now be described in greater detail with reference to the accompanying drawings to enable those skilled in the art to work the same with ease. However, embodiments may be realized in a variety of different configurations, and not limited to descriptions provided herein. Further, those that are irrelevant with the description are omitted so as to describe embodiments more clearly, and similar drawing reference numerals are used for the similar elements throughout the description.

Below, certain embodiments will be described in detail with reference to the accompanying drawings.

FIG. 1 is a block diagram of an electronic device, according to an embodiment.

An electronic device 100 may be a large-screen display device, such as an electronic board which is used in a lecture room, a meeting room, etc., where various community environments are provided between a plurality of users or an electronic billboard which is installed on the outer wall of a building.

This electronic device 100 may include an inputter 110, a display 120, and a processor 130.

The inputter 110 detects a touch drag input of a user or a touch drag input of an input device 200 which will be described later, or both. In addition, the inputter 110 may receive an input of a user command in a variety of forms.

The display 120 displays at least one of a plurality of pages. Further, the display 120 may display a boundary line (hereinafter referred to as "boundary UI") for dividing between a plurality of pages, a navigation window (hereinafter referred to as "navigation UI") for managing a plurality of pages, and the like.

This configuration of the inputter 110 and the display 120 will be described in greater detail below.

The processor 130 controls the display 120 to display at least one of a plurality of pages. Accordingly, the display 120 may display at least one of a plurality of pages of the processor 130. According to an embodiment, when a touch drag input is detected through the inputter 110 while at least one of the plurality of pages is displayed, the processor 130 may identify whether a starting point on which the touch drag input is detected is positioned within a first area of the display.

As a result of determining that the starting point on which the touch drag input is detected is positioned within the first area, the processor 130 performs a scroll function for a plurality of pages according to the touch drag input. Accordingly, the display 120 may display a scrolled page. The first area may refer to an area corresponding a predetermined distance range from boundaries of each of the plurality of pages. That is, the first area may be an area within a predetermined distance range based on a point at which a boundary UI is displayed.

In a case in which the starting point of the detected touch drag input is positioned within a second area, the processor 130 performs a drawing function according to the detected touch drag input. Accordingly, the display 120 may display a drawing image corresponding to the touch drag input. The second area may be an area other than the first area. That is, the second area may refer to an area corresponding to an area outside a predetermined distance range from boundaries of each of the plurality of pages.

According to another embodiment, the processor 130 may control the display 120 to display an icon for displaying a navigation UI for managing a plurality of pages together with the drawing image. According to this embodiment, in a state in which an icon for displaying a navigation UI is displayed on the display 120, when a user command for selecting the corresponding icon is input, the processor 130 may control the display 120 to display the navigation UI together with at least one page on one area of the display 120 while the at least one page is displayed on the display 120.

Accordingly, the display 120 may display a navigation UI together with the at least one page on one area.

Meanwhile, the navigation UI displayed on one area of the display 120 may include an indicator for managing at least one page currently displayed on the display 120. Accordingly, the processor may, when a scroll function is performed, move an indicator included in the navigation UI according to a scroll performed.

Meanwhile, the indicator described above may include at least one of an icon for moving a page currently displayed on the display 120 and an icon for inserting a page, and an icon for deleting a page.

Accordingly, when at least one icon included in the indicator is selected, the processor 130 may move a page correspondingly to the at least one selected icon, insert a page or delete a page.

According to another embodiment, while the at least one page and the navigation UI are simultaneously displayed on the display 120, when a rotation of the electronic device 100 is detected, the processor 120 may not rotate the at least one page and rotate the navigation UI according to a rotation of the electronic device 100.

In more detail, the display 120 may be implemented as a plurality of layers. Accordingly, the processor 130 may maintain a display state of a layer displaying at least one page from among a plurality of layers. Meanwhile, the processor 130 may perform image processing with respect to the navigation UI so that a display state of another layer displaying the navigation UI from among the plurality of layers is displayed in a changed form according to a rotating direction of the electronic device 100.

Accordingly, the display 120 may change a display state of the navigation UI while maintaining a display state of the at least one page and display the same.

According to another embodiment, the processor 130 may control the display 120 to display a scroll pad for scrolling a plurality of pages on at least one page. According to this embodiment, the display 120 may display a scroll pad for scrolling a plurality of pages. When a user command is input through the scroll pad displayed on the display 120, the processor 130 may scroll a plurality of pages according to the user command. Accordingly, the display 120 may display a scrolled page.

Meanwhile, in a case in which a starting point of a touch drag input is positioned within a second area, the processor 130 performs a different function according to a size of an area in which the touch drag input is detected.

In more detail, when a size the area in which the touch drag input is detected is less than or equal to a first threshold, the processor 130 may perform a drawing function according to the touch drag input. Accordingly, the display 120 may display a drawing image drawn according to the touch drag input.

When a size of the area in which the touch drag input is detected is greater than the first threshold and less than a second threshold, the processor 130 performs an eraser function to delete an image displayed on the display 120 according to the touch drag input.

When a size of the area in which the touch drag input is detected exceeds the second threshold, the processor 130 performs a function for inserting a predefined image according to the touch drag input. In more detail, when a size the area in which the touch drag input is detected exceeds the second threshold, the processor 130 may control the display 120 to display at least one predefined image. Accordingly, the display 120 may display at least one predefined image on the periphery to the area in which the touch drag input is detected. Thereafter, when a user command for selecting at least one image is input, the display 120 may display an image corresponding to the user command according to a control command of the processor 130.

Hereinbelow, a display 120 according to an embodiment will be described in greater detail.

Figure 2:
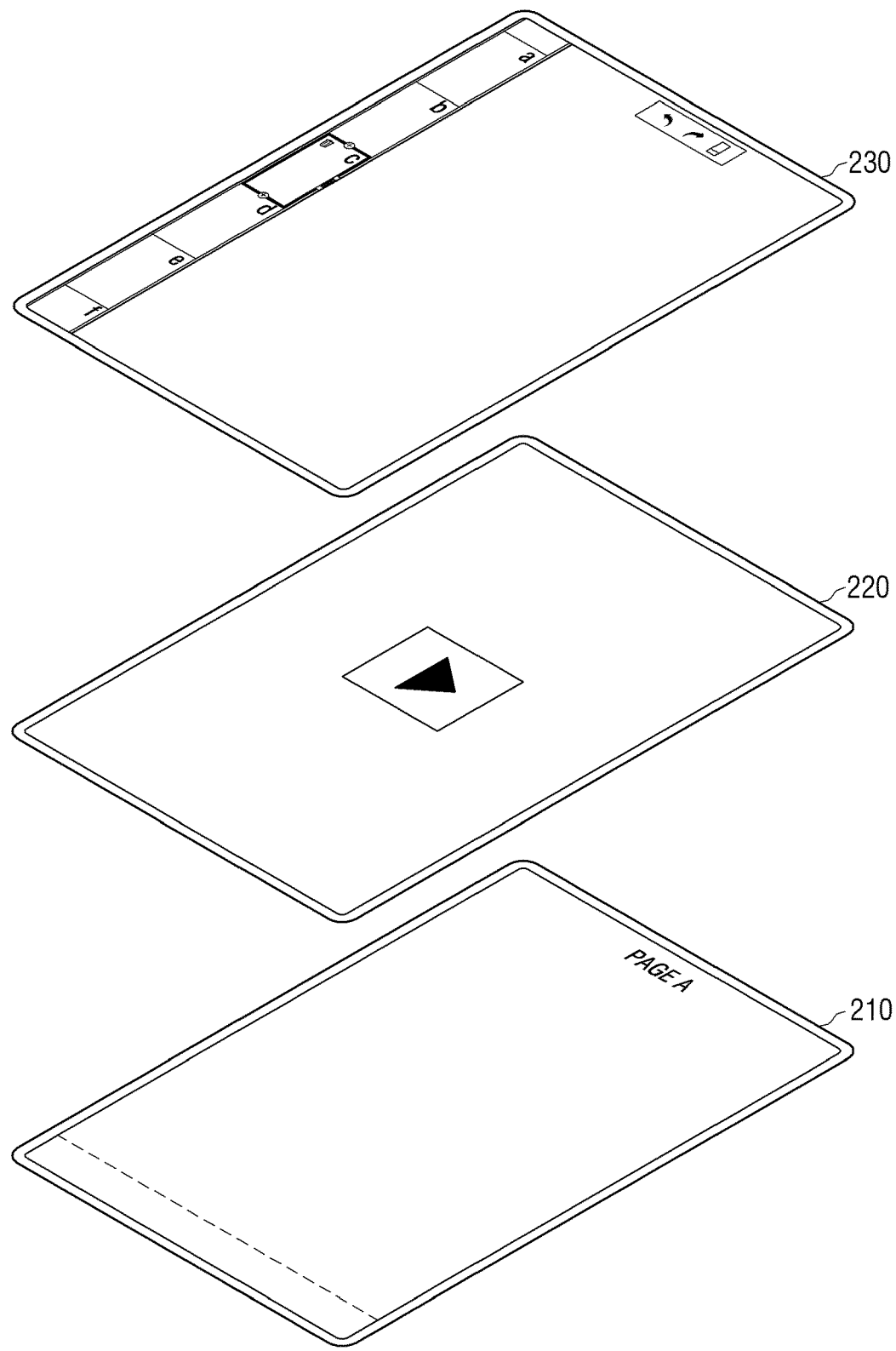
FIG. 2 is a diagram illustrating a display structure, according to an embodiment.

FIG. 2 is a diagram illustrating an example display structure, according to an embodiment.

As shown in FIG. 2, a display 120 may include a structure of a plurality of layers 210, 220 and 230.

A first layer 210 from among the plurality of layers 210, 220 and 230 may display at least one page from among a plurality of pages, a boundary UI for distinguishing between a plurality of pages, and a drawing image corresponding to a user's touch.

A second layer 220 may be disposed at an upper end of the first layer 210 and display a content received from an external terminal (not illustrated) or a content pre-stored in the electronic device 100.

A third layer 230 may be disposed at an upper end of the second layer 220 and display a navigation UI, a scroll pad for scrolling a plurality of pages, an icon for displaying the navigation UI, and the like.

According to an embodiment, when a rotation of the electronic device 100 is detected, in a state in which the display 120 is implemented as first to third layers 210 to 230, including at least one page is displayed on the first layer 210, and a navigation UI is displayed on the third layer 230 as described above, the processor 130 may maintain a display state of the first layer 210, and rotate the navigation UI displayed on the third layer 230 according to a rotation of the electronic device and display the rotated navigation UI on the third layer 230.

Meanwhile, the example is not limited thereto, and the plurality of layers 210 to 230 may be disposed in a different structural form from the disposition structure described above.

Figure 3:
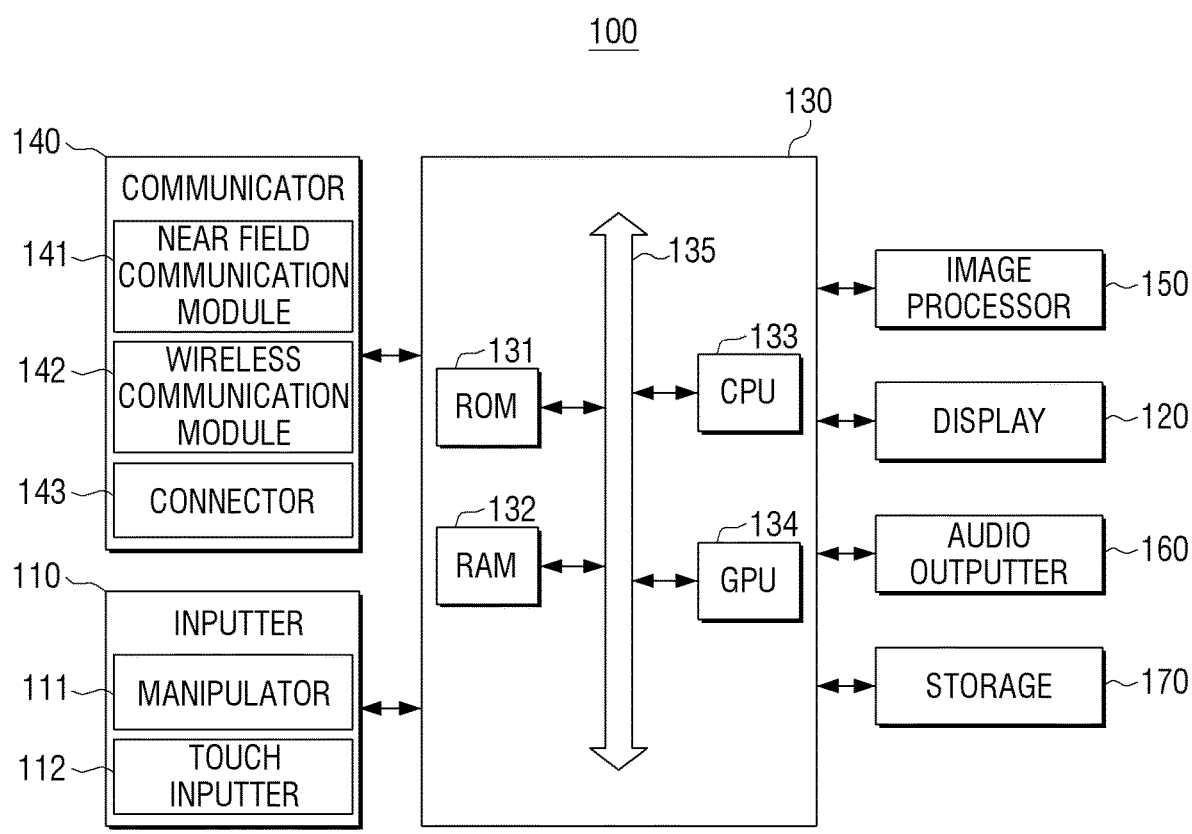
FIG. 3 is a detailed block diagram of an electronic device, according to an embodiment.

FIG. 3 is a block diagram of a detailed electronic device, according to an embodiment.

As described above, in a case in which the electronic device 100 is a large-screen display device, such as an electronic board or an electronic billboard installed on an outer wall of a building, the electronic device may further include, in addition to the inputter 110, display 120 and processor 130 described above, a communicator 140, an image processor, an audio outputter 160, and a storage 170 as illustrated in FIG. 3.

According to an embodiment, the inputter 110 may be a hardware or software, or a combination of hardware and software, that capable of receiving a variety of user commands and transferring the received user commands to the processor 130. The inputter may include a manipulator 111 or a touch inputter 112, or both.

The manipulator 111 may be implemented as a key pad including various function keys, number keys, special keys, letter keys, and the like. In addition, the touch inputter 112 may be implemented as a touch pad which forms a mutual layer structure with the display 120 described above. According to an embodiment, the touch inputter 112 may receive a selection command for various UI-related icons displayed on the display 120 or display a drawing image according to a touch drag input on at least one page displayed on the display 120.

The display 120 may be implemented by using a Liquid Crystal Display (LCD), an Organic Light Emitting Display (OLED), or other types of display.

The communicator 140 may include a near field communication module 141, a wireless communication module 142, and a connector 143.

The near field communication module 141 is a module for performing near field wireless communication with at least one external terminal (not illustrated) positioned at a near distance, and may, for example, include at least one of a Bluetooth module, a near field communication (NFC) module, a WiFi module, and a ZigBee module.

The wireless communication module 142 is a module which communicates by being connected to an external network according to a wireless communication protocol, such as IEEE and the like, i.e., a wireless LAN module. However, the example is not limited thereto, and the wireless communication module 142 may be a mobile communication module which is connected to a mobile communication network according to various mobile communication standards such as 3rd generation (3G), 3rd generation partnership project (3GPP), and long term evolution (LTE) to perform communications.

The connector 143 is a configuration for providing an interface with a variety of source apparatuses, such as USB 2.0, USB 3.0, HDMI, IEEE 1394, and the like. This connector 143 may receive image-related data received from an external terminal (not illustrated) or an external server (not illustrated) via a cable connected with the connector 143 according to a control command of the processor 130, or may transmit a pre-stored image-related data to an external recording medium. Further, the connector 143 may receive power from a power source through the wired cable physically connected to the connector 143.

The image processor 150 performs signal processing of a received content to a format that may be outputted through at least one of the display 120 of the electronic device 100 and the audio outputter 160 which will be described later.

The audio outputter 160 outputs audio data included in a content received from an external terminal (not illustrated) in the form of audible sound through a speaker (not illustrated).

In addition, the storage 170 may store a content received from an external terminal (not illustrated) or store an operating program for controlling the operation of the electronic device 100. In this regard, the operating program may be a program which is, when the electronic device 100 is turned on, read in the storage 170 and compiled to operate each configuration of the electronic device 100.

Meanwhile, the processor 130 described above may include a ROM 131, a RAM 132, a CPU 133, and a GPU 134. The ROM 131, the RAM 132, the CPU 133, and the GPU 134 may be interconnected with each other via a bus.

The CPU 133 accesses the storage 170 and performs booting using the O/S stored in the storage 170. In addition, the CPU 133 performs various operations using various programs, contents, and data stored in the storage 170.

The GPU 134 generates a display screen including a variety of objects, such as an icon, an image, a text, and the like. In more detail, the GPU 134 calculates an attribute value, such as a coordinate value, shape, size and color of each of the objects to be displayed, according to a layout of a screen based on the received control command, and generates a display screen of various layouts including the object based on the calculated attribute value.

The ROM 131 may store a command set, and the like for system booting. If a turn-on command is input and the power is supplied, the CPU 133 copies the O/S stored in the memory 170 into the RAM 132 according to the command stored in the ROM 131, and boots the system by executing the O/S. When the booting is completed, the CPU 133 may copy the various programs stored in the storage 170 to the RAM 132, and perform various operations by implementing the programs copied to the RAM 132.

The processor 130 may be implemented by a system-on-a chip (SOC) or a system on chip (Soc) by being combined with each of configurations described above.

Additionally, the operations of the above-described processor 130 may be performed by a program stored in the storage 170. In this regard, the storage 170 may be implemented by using at least one of a memory card (e.g., an SD card and a memory stick) which can be mounted in or dismounted from a read only memory (ROM) 131, a random access memory (RAM) 132, or the electronic apparatus 100, a non-volatile memory, a volatile memory, a hard disk drive (HDD), and a solid state drive (SSD).

The respective configurations of the electronic device 100 according to an embodiment has been described above. Hereinbelow, the operations performed in the electronic apparatus 100 according to an embodiment will be described through various embodiments.

Figure 4:
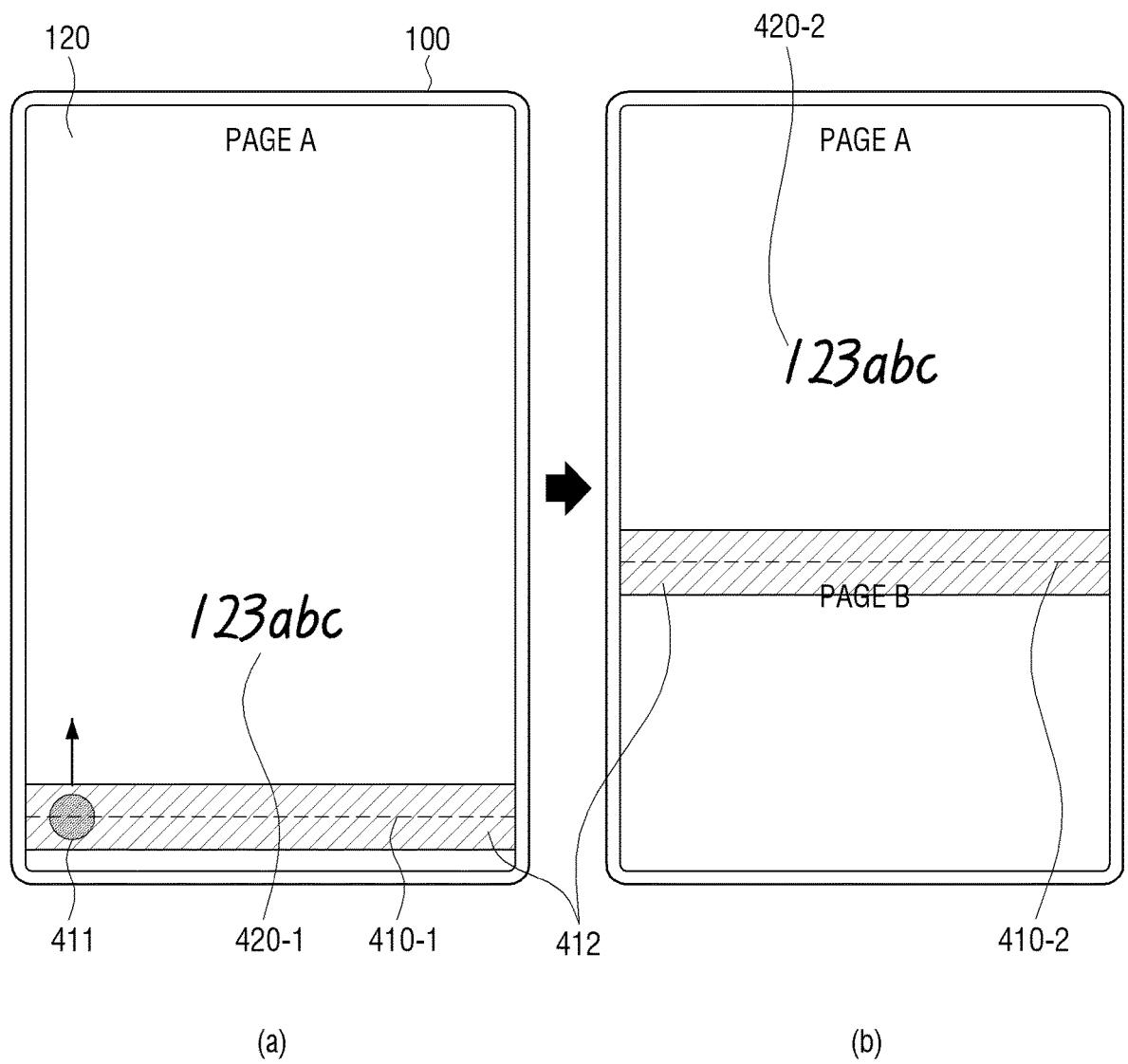
FIGS. 4 to 6 are diagrams illustrating a scroll operation performed in the electronic device, according to an embodiment.
Figure 5:
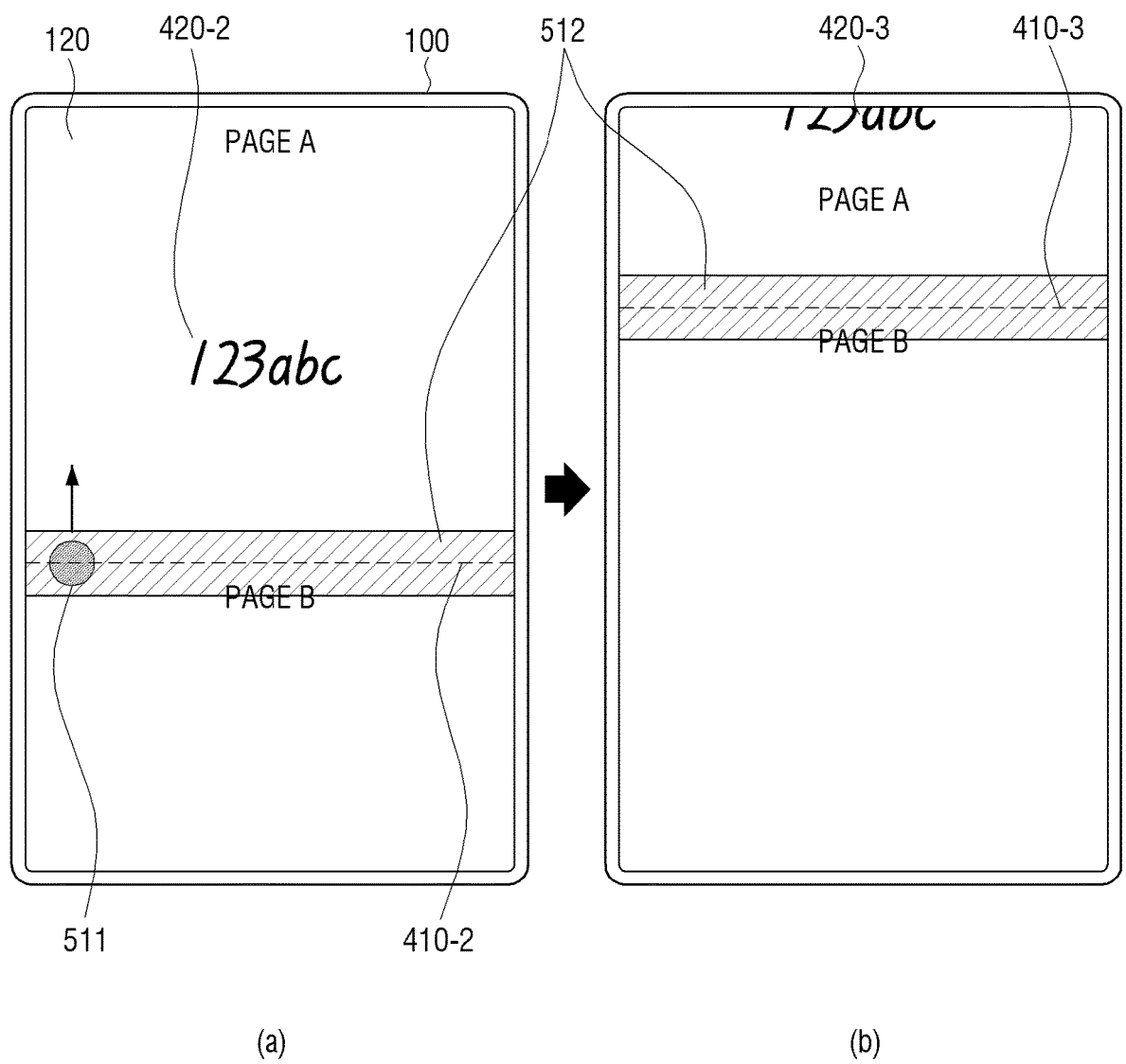
Figure 6:
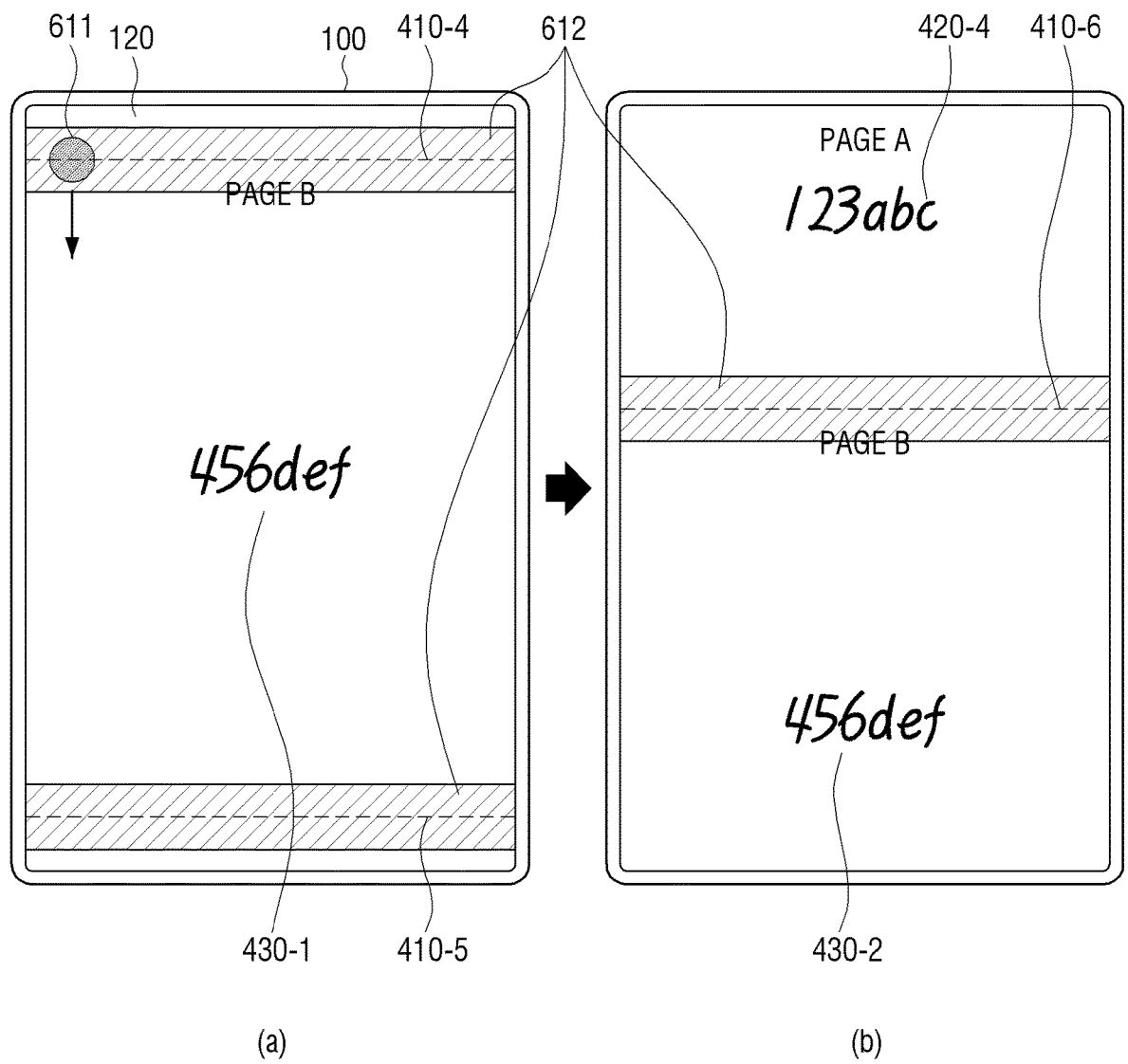

FIGS. 4 to 6 are diagrams illustrating that a scroll operation is performed in the electronic device, according to an embodiment.

As illustrated in section (a) of FIG. 4, the electronic device 100 may display the entire start page (hereinafter referred to as "page A") from among a plurality of pages on the display 120. In addition, the electronic device 100 may display a boundary UI 410 for distinguishing between the page A and the next page on the display 120. The first area 412 may refer to an area corresponding to a predetermined distance range from boundaries of each of the plurality of pages. That is, the first area 412 may be an area within a predetermined distance range from a point on which the boundary UI 410 is displayed.

While the page A and the boundary UI 410 are displayed, when a touch drag input of a user for a point 411 within the first area 412 is detected, the electronic device 100 performs a scroll operation to a direction in which the touch drag input is detected.

In other words, the electronic device 100 may move the page A displayed on the display 120 in the upward direction by performing a scroll operation in the direction in which the touch drag input is detected. Accordingly, the electronic device 100 may display a portion of the page A and a portion of the next page, a page B, on the display 120 as illustrated in section (b) of FIG. 4. In addition, the electronic device 100 may move the boundary UI 410-1 for distinguishing between the page A and the page B in an upward direction, and display the boundary UI 410-2 which is moved to the upward direction on the display 120.

The electronic device 100 may display a drawing image 420-1 called "123abc" in a second area of the display 120 which displays the entire page A. The second area may be an area other than the first area 412. That is, the second area may refer to an area corresponding to an area outside a predetermined distance range from boundaries of each of a plurality of pages.

Accordingly, the electronic device 100 may, when the page A is moved to an upward direction according to a touch drag input of the user at spot 411, move a drawing image 420-1 displayed in the first area by a distance the page A has moved to the upward direction, and display a drawing image 420-2.

Thereafter, as illustrated in section (a) of FIG. 5, when a touch drag input of the user for a point 511 from among a first area 512 of a predetermined distance range from the boundary UI 410-1 for distinguishing between the pages A and B is detected, the electronic device 100 performs a scroll operation to a direction in which the touch drag input is detected.

In other words, the electronic device 100 may move the pages A and B displayed on the display 120 in the upward direction by performing a scroll operation in the direction in which the touch drag input is detected.

Accordingly, the electronic device 100 may display a display area of the page B displayed on the display 120 to be larger than a display area of the page A as illustrated in section (b) of FIG. 5. In addition, the electronic device 100 may move the boundary UI 410-2 for distinguishing between the page A and the page B in an upward direction, and display the boundary UI 410-3 which is moved to the upward direction on the display 120.

In addition, the electronic device 100 may move a drawing image 420-2 displayed in the second area by a distance the page A has moved to the upward direction, and display a drawing image.

That is, following the page A being moved in the upward direction, the electronic device 100 may display only a partial drawing image 420-3 from among the entire drawing image 420-2.

According to the scroll operation described above, when the entire page B is displayed, the electronic device 100 may display a boundary UI 410-4 for distinguishing between the page A and the page B and a boundary UI 410-5 for distinguishing between the page B and the next page (hereinafter referred to as "page C") on the display 120, as illustrated in section (a) of FIG. 6.

The electronic device 100 may display a drawing image 430-1 called "456def" in a second area of the display 120 which displays the entire page B. The second area may refer to an area other than the first area 612. That is, the second area may refer to an area corresponding to an area outside a predetermined distance range from boundaries of each of a plurality of pages. In a state in which the drawing image 430-1 of "456def" is displayed in the second area of the display 120, when a touch drag input of the user for a point 611 within an area 612 of a predetermined distance range from the boundary UI 410-4 for distinguishing between the pages A and B is detected, the electronic device 100 performs a scroll operation to move the page B in a downward direction.

Accordingly, the electronic device 100 may display the pages A and B on the display 120 as illustrated in section (b) of FIG. 6. In addition, following an input of a user's touch for spot 611, the electronic device 100 may move the boundary UI for distinguishing between the pages A and B in a downward direction, and display a boundary UI 410-6 which has been moved to the downward direction on the display 120.

In a case in which the pages A and B are displayed on the display 120 according to an input of a user's touch for the spot 611, the electronic device 100 displays a drawing image 420-4 of "123abc" on the display on which the page A is displayed. In addition, following the input of the user's touch for the spot 611, the electronic device 100 may move a drawing image 430-1 of "456def" displayed in the first area of the display 120 to an area in which the page B is displayed. Accordingly, the electronic device 100 may display a drawing image 430-2 of "456def" which has been moved to the area in which the page B is displayed on the display 120.

Figure 7:
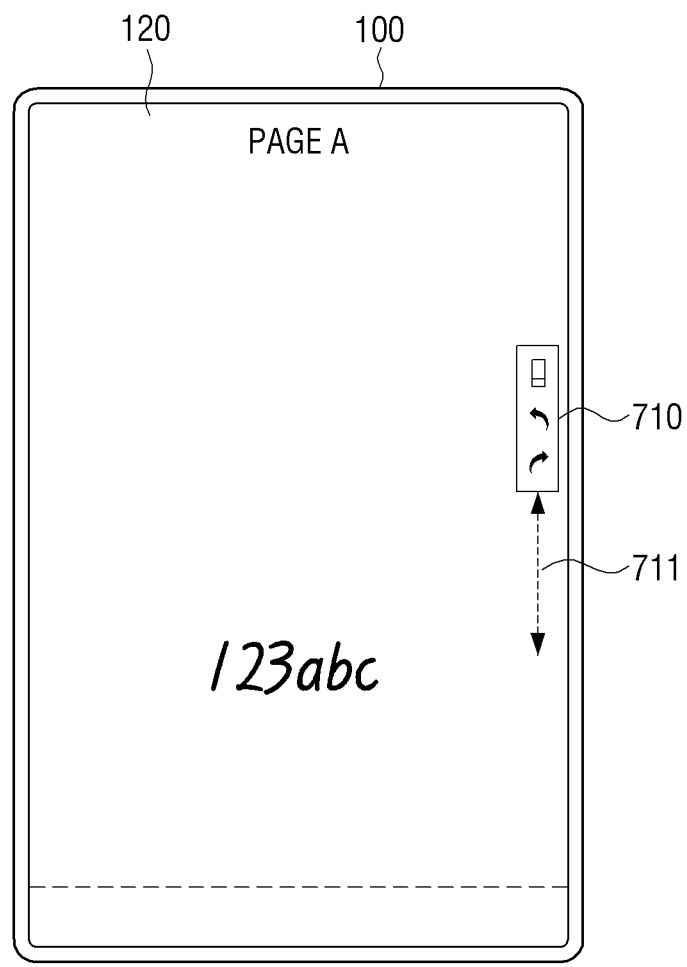
FIG. 7 is a diagram illustrating a scroll operation performed in the electronic device, according to another embodiment.

FIG. 7 is a diagram illustrating that a scroll operation is performed in the electronic device, according to another embodiment.

As illustrated in FIG. 7, the electronic device 100 may display a control UI 710 for controlling at least one page in one area of the display 120 according to a user command.

In this regard, the control UI 710 may include a scroll pad 711 for scrolling a plurality of pages. Further, the control UI 710 may display a navigation UI for managing a plurality of pages or may further include a plurality of icons for editing at least one page displayed on the display 120.

Accordingly, when a user command for the scroll pad 711 included in the control UI 710 is input, the electronic device 100 may move a page displayed on the display 120 in an upward direction or a downward direction towards a direction corresponding to the user command and display the moved page.

As illustrated in FIG. 7, the electronic device 100 may display a page A, which is a start page, on the display 120. In a state in which the page A is displayed, when a user command to scroll in an upward direction is input through the scroll pad 711 included in the control UI 710, the electronic device 100 may move the page A in the upward direction and display the moved page A on the display 120. In a state in which the page A is moved in the upward direction, when a user command to scroll in a downward direction is input through the scroll pad 711 included in the control UI 710, the electronic device 100 may move the page A in the downward direction and display the moved page A on the display 120.

Figure 8:
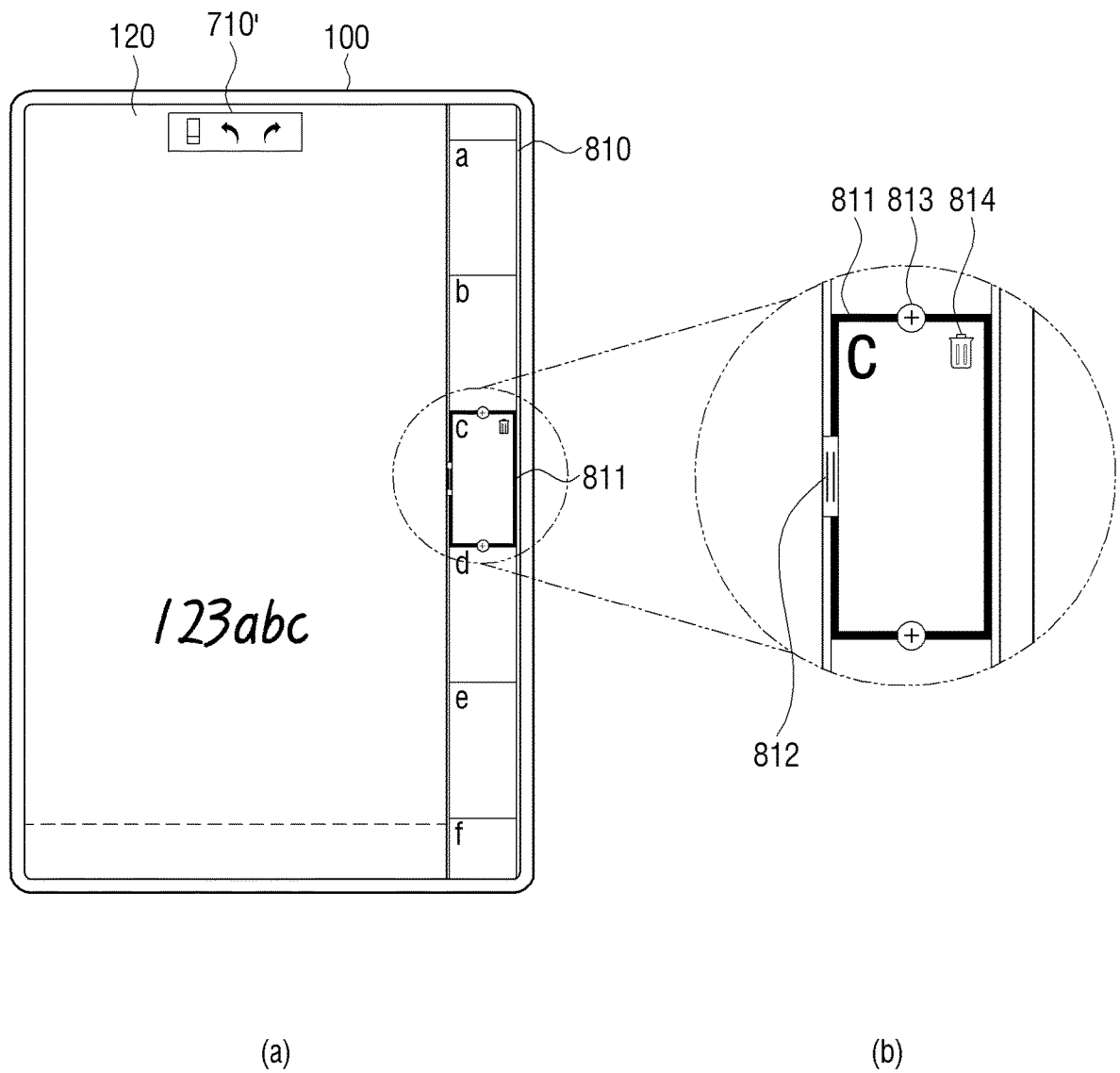
FIG. 8 is a diagram illustrating a navigation user interface (UI) provided in the electronic device, according to an embodiment.

FIG. 8 is a diagram illustrating an example navigation UI provided in the electronic device, according to an embodiment.

As illustrated in FIG. 7, when a user command for an icon for displaying a navigation UI from among a plurality of icons included in the control UI 710, the electronic device 100 may display the navigation UI 810 in one area of the display 120 on which at least one page is displayed.

In more detail, when a user command is input for the icon for displaying the navigation UI, the electronic device 100 may display the navigation UI 810 in an area on the right side of the display 120, and display a control UI 710' in an area of an upper end of the display 120.

Meanwhile, the navigation UI 810 may be, as described above, a UI for managing a plurality of pages and may include an element corresponding to each of the plurality of pages. In addition, on a current element corresponding to at least one page currently displayed on the display 120 from among a plurality of elements, an indicator 811 for managing the corresponding page may be displayed.

As illustrated in section (a) of FIG. 8, the electronic device 100 may display a page C on the display 120. In this regard, the electronic device 100 may display an indicator 811 for managing the page C on a current element corresponding to the page C displayed on the display 120 from among a plurality of elements included in the navigation UI 810.

The indicator 811 which is displayed on the current element corresponding to the page C displayed on the display 120 may include a plurality of icons.

In more detail, as illustrated in section (b) of FIG. 8, the indicator 811 may include an icon 812 for moving a page displayed on the display 120, an icon 813 for inserting a page, and an icon 814 for deleting a page.

For example, when a user command for the icon 812 for moving a page is input, the electronic device 100 may scroll a plurality of pages so that a page of a direction corresponding to a direction to which the icon 812 is moved is displayed on the display 120.

The icon 813 for inserting a page may be disposed at an upper end or lower end of the indicator 811. If the icon 813 disposed at the upper end of the indicator 811 is selected, the electronic device 100 may display a new element between the current element on which the indicator 811 is displayed and the previous element. Thereafter, the electronic device 100 may display the indicator 811 on the new element and display a new page corresponding to the new element on the display 120.

When the icon 814 for deleting a page is selected, the electronic device 100 deletes the current element on which the indicator 811 is displayed and the page C corresponding to the current element from the display 120.

When the current element is deleted, the electronic device 100 may display an indicator on the previous or next element of the current element, and display a page corresponding to an element on which the indicator is displayed on the display 120.

Figure 9:
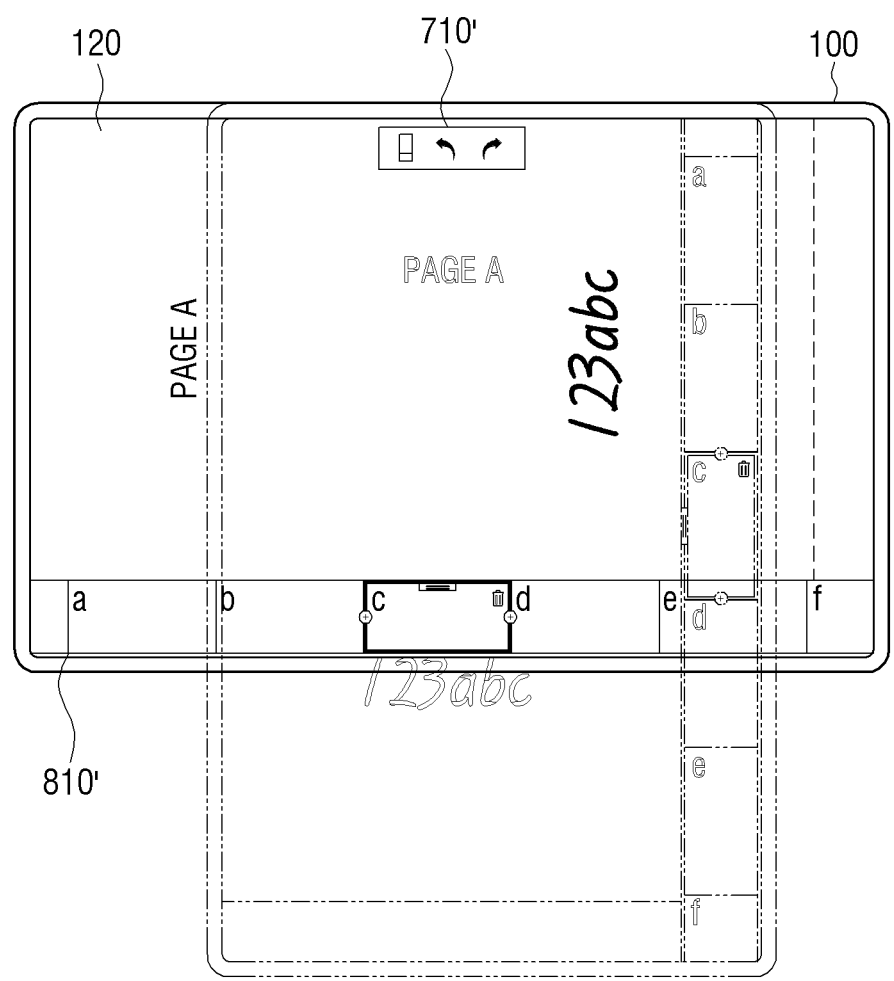
FIG. 9 is a diagram illustrating a display controlled according to a rotation of an electronic device in the electronic device, according to an embodiment.

FIG. 9 is a diagram illustrating that a display is controlled according to a rotation of an electronic device in the electronic device, according to an embodiment.

As illustrated in FIG. 8, the electronic device 100 may display a navigation UI 810 in an area on the right side of the display on which the page C is displayed, and display a control UI 710' in an area at an upper end of the display 120. That is, the electronic device 100 may display the navigation UI 810 in an area adjacent to a first surface from among four surfaces, and display the control UI 710' in an area adjacent to a second surface. In addition, the electronic device 100 may display a drawing image of "123abc" on the display 120 on which the page C is displayed.

In this state, when a rotation of the electronic device 100 is detected, the electronic device 100 changes positions of the navigation UI 810' and the control UI 710' according to a rotating direction.

In more detail, as illustrated in FIG. 9, when an event that the electronic device 100 is rotated in a left side direction is detected, the electronic device 100 may dispose the navigation UI 810' which is disposed in an area adjacent to the first surface of the display 120 in an area adjacent to a third surface of the display 120 and display the same, and dispose the control UI 710' which is disposed in an area adjacent to the first surface of the display 120 in an area adjacent to the second surface of the display 120 and display the same.

In this regard, the electronic device 100 may display the page C displayed on the display 120 and the drawing image of "123abc" displayed on the display 120 in an unrotated state.

Thereafter, when a touch drag input of a user for scrolling is detected, the electronic device 100 performs a scroll operation for a plurality of pages according to the detected touch drag input. Accordingly, the display 120 may display at least one of the page C which has been moved in the left direction or the right direction and a page adjacent to the page C according to the touch drag input.

Figure 10:
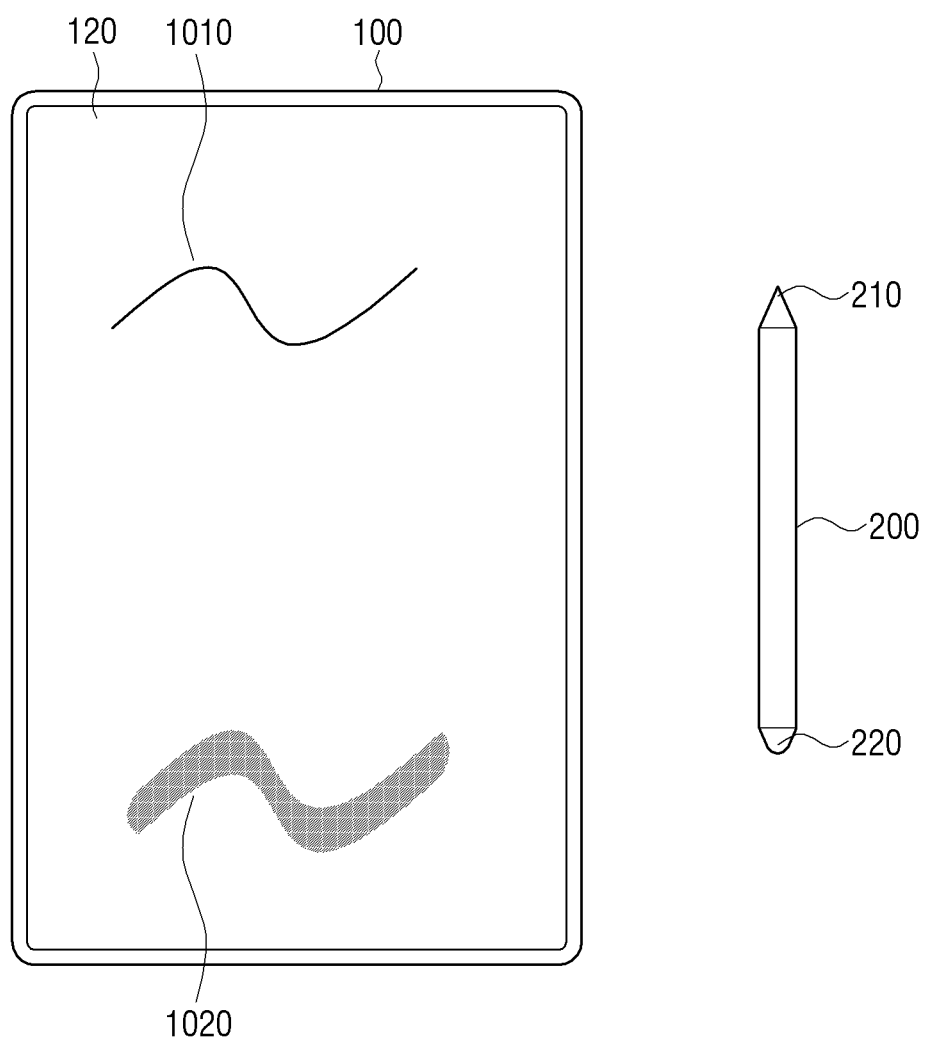
FIGS. 10-12 are diagrams illustrating an electronic device capable of performing an operation according to a touch drag input, according to an embodiment.
Figure 11:
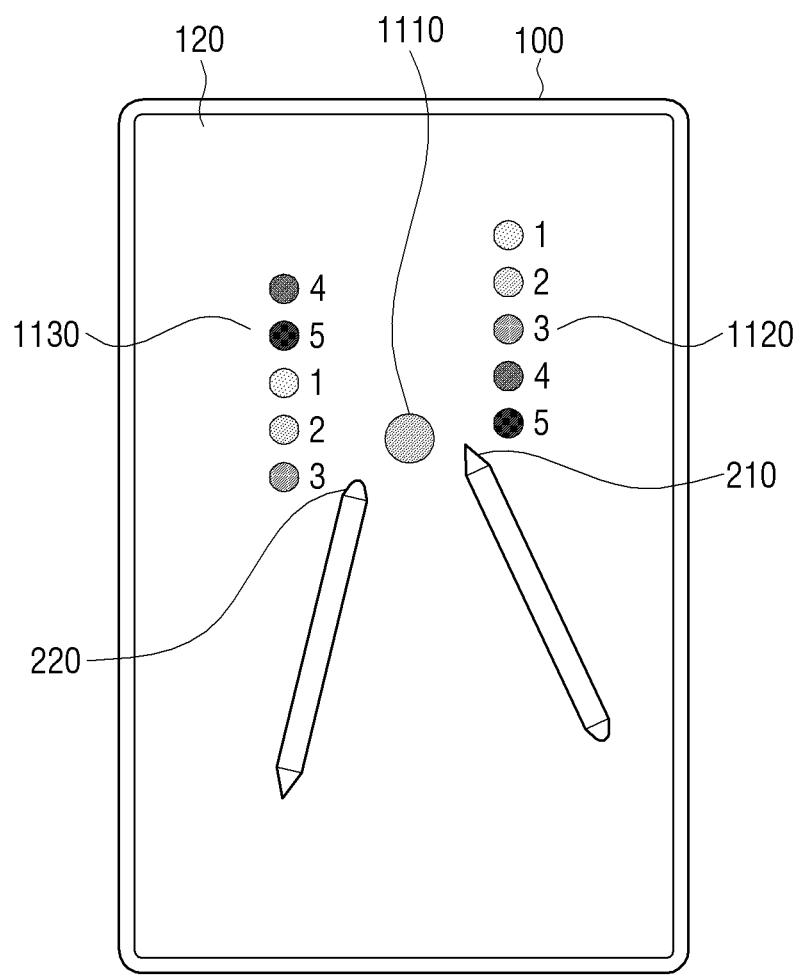
Figure 12:
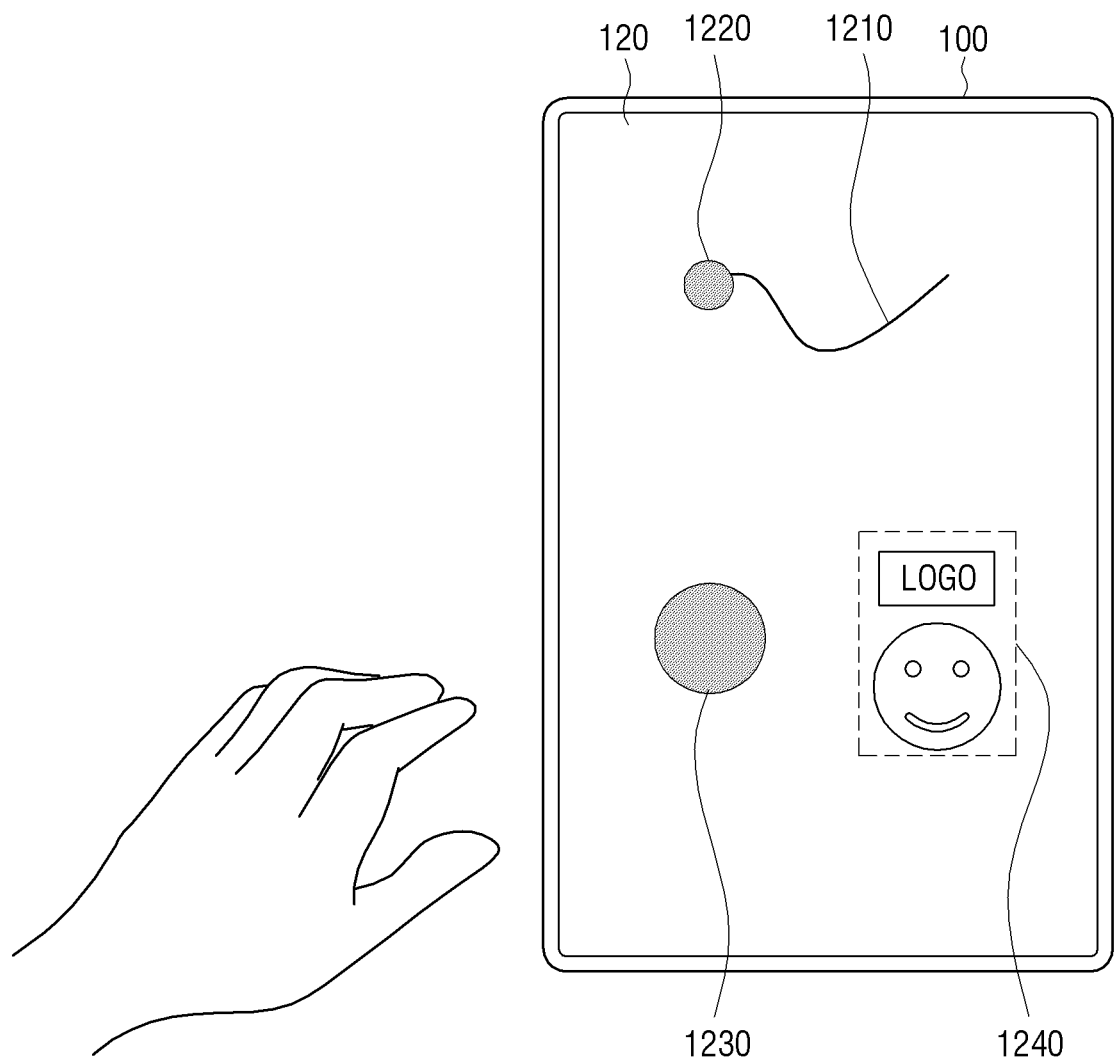

FIGS. 10-12 are diagrams illustrating that an electronic device performs an operation according to a touch drag input, according to an embodiment.

According to an embodiment, as illustrated in FIG. 10, the electronic device 100 may perform a drawing function according to a touch drag input of the input device 200, such as a touch pen, and display a drawing image corresponding to the touch drag input of the input device 200 on the display 120.

The electronic device 100 performs different drawing functions depending on a size of an area in which the touch drag input of the input device 200 is detected. According to an embodiment, when a size of an area in which the touch drag input of the input device is initially detected is less than or equal to a median value of a predetermined first threshold, the electronic device 100 performs a drawing function of a marker pen type. According to another embodiment, when a size of an area in which the touch drag input of the input device is initially detected exceeds a median value of a predetermined first threshold or equal to the first threshold, the electronic device 100 performs a drawing function of a highlighter pen.

In more detail, the opposite ends of the input device 200 may be implemented in different types. That is, one end of the input device 200 may be implemented in a first type 210 with a thin nib, and the other end of the input device 200 may be implemented in a second type 220 with a thick nib.

Accordingly, when a touch drag input is detected at one end of the input device 200 implemented in the first type 210, the electronic device 100 may display a drawing image 1010 of a marker pen type on the display 120 according to the touch drag input of the input device 200.

When a touch drag input is detected at the other end of the input device 200 implemented in the second type 220, the electronic device 100 may display a drawing image 1020 of a highlighter pen type on the display 120 according to the touch drag input of the input device 200.

According to an embodiment, as illustrated in FIG. 11, when a long press touch input 1110 is detected through the input device 200 at area 1110, the electronic device 100 may display a first or second color UIs 1120 and 1130 for changing a color of a drawing image on the display 120 according to a size of an area in which the long press touch input 1110 is detected.

In more detail, when it is determined that a long press touch input 1110 is detected through one end of the input device 200 implemented in the first type 210, the electronic device 100 may display the first color UI 1120 on the display 120. Thereafter, when one of icons corresponding to a plurality of colors included in the first color UI 1120 is selected, the electronic device 100 may set a color of a drawing image of a marker pen type to be a color corresponding to the selected icon.

When it is determined that a long press touch input 1110 is detected through the other end of the input device 200 implemented in the second type 220, the electronic device 100 may display the second color UI 1130 on the display 120. Thereafter, when one of icons corresponding to a plurality of colors included in the second color UI 1130 is selected, the electronic device 100 may set a color of a drawing image of a highlighter pen type to be a color corresponding to the selected icon.

The electronic device 100 may display a first color UI 1120 or a second color UI 1130 for changing a color of a drawing image in an area adjacent to an area in which a long press touch input 1110 is detected. In addition, the electronic device 100 may differently set a disposition order of icons corresponding to each of a plurality of colors included in the first color UI 1120 or the second color UI 1130 according to a pen type. In addition, the electronic device 100 may reset a disposition order of a plurality of icons included in the first color UI 1120 or the second color UI according to a frequency of selection of the plurality of icons included in the first color UI 1120 or the second color UI 1130.

According to an embodiment, as illustrated in FIG. 12, the electronic device 100 may delete a drawing image displayed on the display 120 or perform a function of inserting a predefined image in the display 120 according to a touch drag input of a user.

In more detail, the electronic device 100 may, when a touch drag input of a user is detected, determine whether a size of an touch area in which the touch drag input is detected exceeds a predetermined first threshold and is less than a second threshold. As a result of determination, when the area of the touch area in which the touch drag input is detected exceeds the predetermined first threshold and is less than the second threshold, the electronic device 100 may delete a drawing image displayed on the display 120 according to the drag input of the user.

When the size of the touch area in which the touch drag input is detected, i.e., area 1230, exceeds a predetermined second threshold, the electronic device 100 may display a plurality of predefined images 1240 at an area adjacent to the area 1230 in which the touch input of the user is detected. Thereafter, when one of the displayed images 1240 is selected, the electronic device 100 may display the selected image 1240 on the display 120.

When the size of the touch area in which the touch drag input of the user is detected, i.e., area 1220, is less than or equal to the predetermined first threshold, the electronic device 100 may display a drawing image 1210 according to the drag input of the user on the display as illustrated in FIG. 11.

The respective operations of the electronic device 100 according to the various embodiments have been described above. Hereinbelow, a method for controlling an electronic device 100 according to an embodiment will be described.

Figure 13:
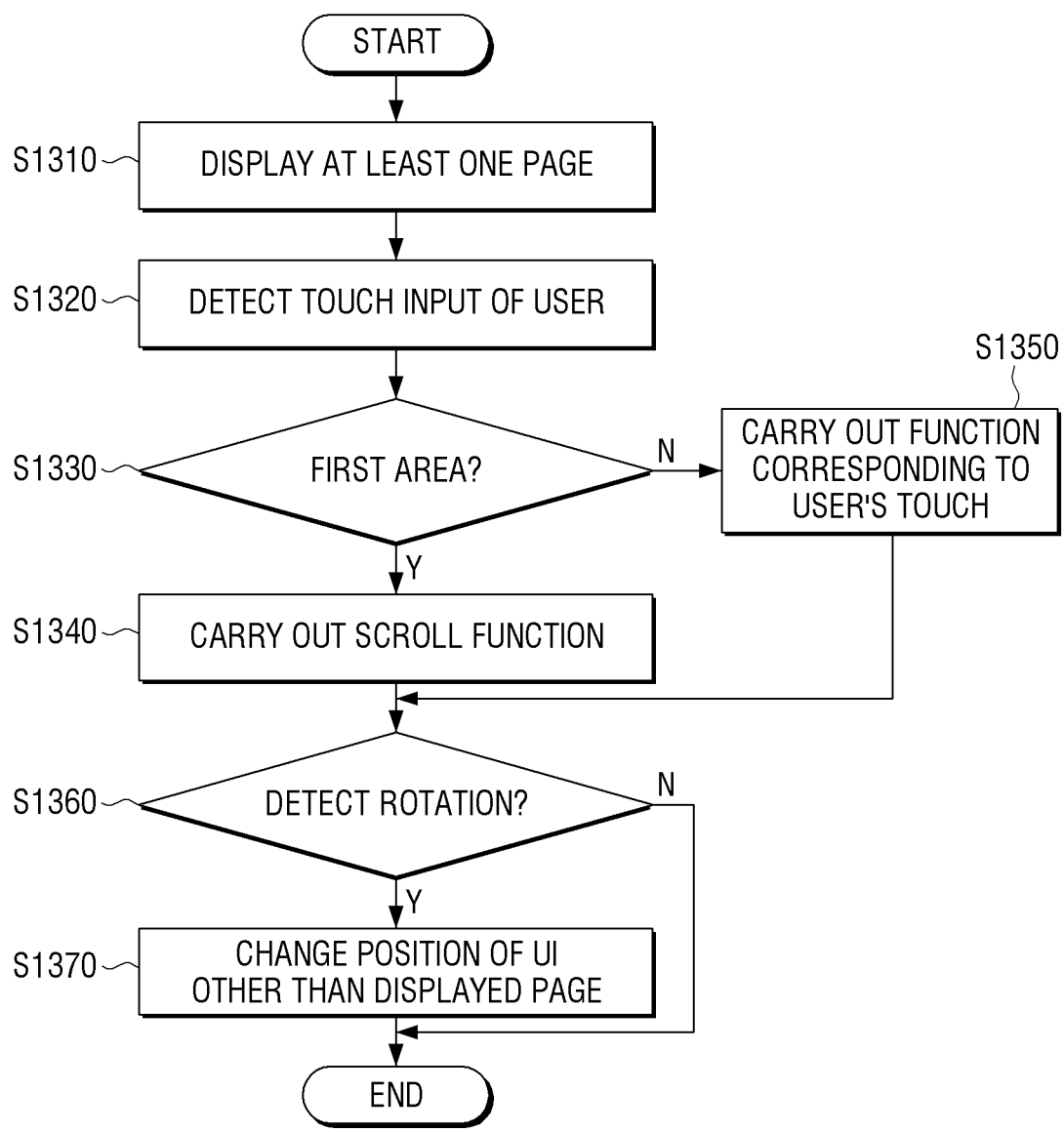
FIG. 13 is a flowchart illustrating a method for controlling an electronic device, according to an embodiment.

FIG. 13 is a flowchart illustrating a method for controlling an electronic device, according to an embodiment.

As illustrated in FIG. 13, the electronic device 100 displays at least one page of a plurality of pages on a display, at operation S1310. In this regard, the electronic device 100 displays a boundary line (hereinafter referred to as "boundary UI") for distinguishing between the plurality of pages together with the at least one page.

While the at least one page and the boundary UI are displayed, a touch drag input is detected at operation S1320. Thereafter, the electronic device 100 determines whether a start point of the detected touch drag input is positioned within a first area of the display, at operation S1330. In this regard, the first area may be an area within a predetermined range based on the boundary UI. According to an embodiment, the first area may be on the boundary UI. According to another embodiment, the first area may be within a predetermined distance from the boundary UI.

When it is determined that the start point of the touch drag input is positioned within the first area, the electronic device 100 performs a scroll function for the plurality of pages according to the touch drag input, at operation S1340.

While the at least one page is displayed, the electronic device 100 may display a control UI including an icon for displaying a navigation window (hereinafter referred to as "navigation UI") for managing the plurality of pages together with the at least one page.

Accordingly, when a user command to select an icon selected in the control UI is input, the electronic device 100 may display a navigation UI in one area of the display while the at least one page is displayed.

Meanwhile, the navigation UI may include an indicator for managing at least one page currently displayed on the display. Accordingly, in a case in which a scroll function is performed with respect to a plurality of pages, the electronic device 100 may move the indicator according to scroll.

Meanwhile, the indicator described above may include at least one of an icon for moving a page currently displayed on the display and an icon for inserting a page, and an icon for deleting a page.

According to another embodiment, the electronic device 100 may not only an icon for displaying a navigation UI but also a control UI further including a scroll pad for scrolling a plurality of pages while at least one page is displayed on a display on the display on which the at least one page is displayed.

However, the example is not limited thereto, and the electronic device 100 may display a control UI further including an icon for editing at least one page displayed on the display on the display on which the at least one display is displayed.

When a user command is input through a scroll pad included in the control UI, the electronic device 100 may scroll a plurality of pages according to the input user command.

When it is determined at operation S1330 that the start point of the touch drag input is not positioned within the first area, the electronic device 100 performs a function different from a scrolling function corresponding to the user's touch drag input. According to an embodiment, the electronic device performs a drawing function according to the touch drag input, at operation S1350.

Thereafter, when a rotation of the electronic device 100 is detected at operation S1360 after the operation S1340 or the operation S1350, the electronic device 100 rotates a UI excluding at least one page displayed on the display according to the rotation of the electronic device 100 and display the rotated UI, at operation S1370.

In this regard, the UI may include at least one of a navigation window (hereinafter referred to as "navigation UI"), a scroll pad for scrolling a plurality of pages, and a control UI including an icon for displaying a navigation UI for managing a plurality of pages and an icon including for editing at least one page displayed on the display.

Figure 14:
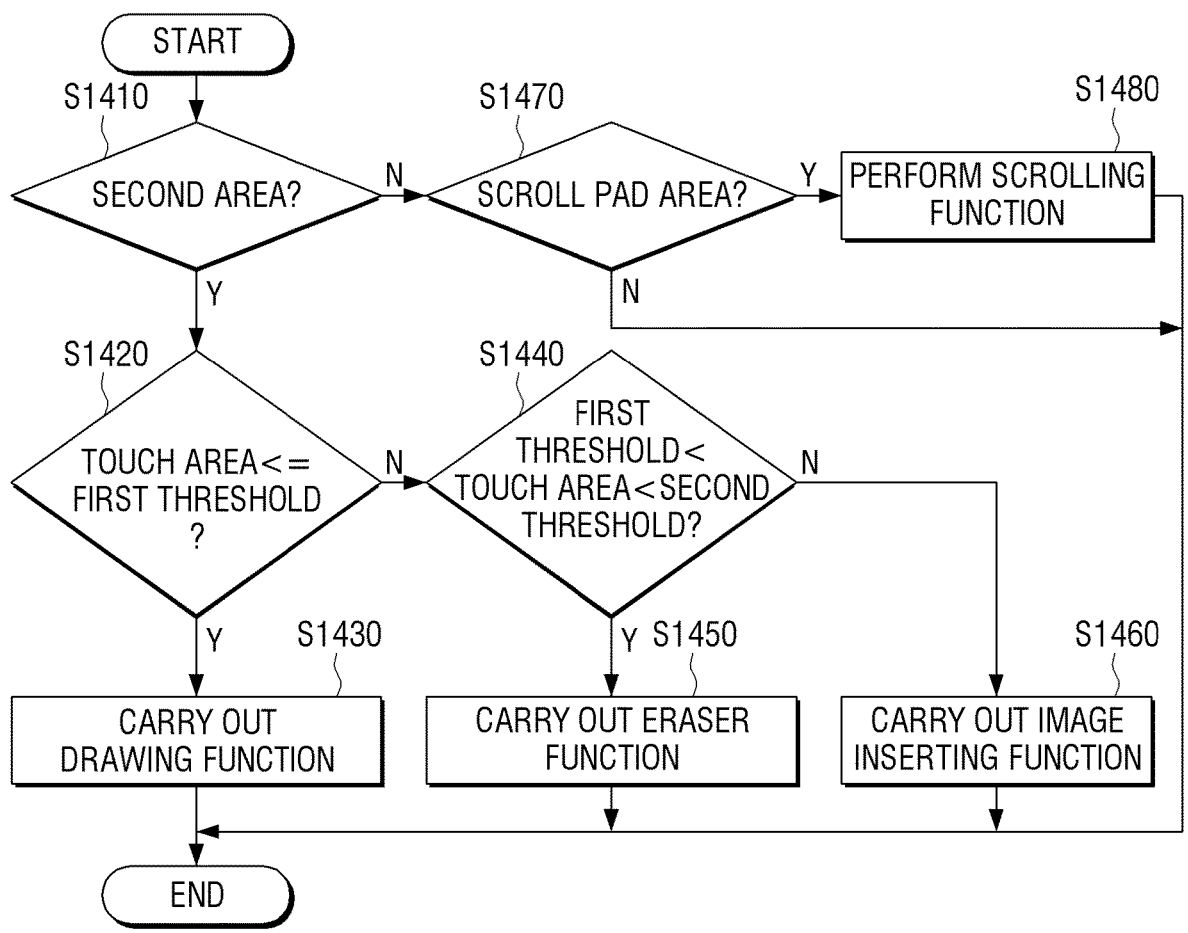
FIG. 14 is a flowchart of a method of performing a function corresponding to a user's touch in the electronic device, according to an embodiment.

FIG. 14 is a flowchart of a method of performing a function corresponding to a user's touch in the electronic device, according to an embodiment.

As illustrated in FIG. 14, when it is determined that the start point of the touch drag input is not positioned within the first area at operation S1330, the electronic device 100 determines whether the start point of the touch point is positioned within a second area, at operation S1410.

When the start point of the touch drag input is positioned within the second area, the electronic device 100 determines whether a size of an area in which the touch drag input is detected is less than or equal to a predetermined first threshold, at operation S1420.

When the size of the touch area in which the touch drag input is detected is less than or equal to the predetermined first threshold, the electronic device 100 performs a drawing function according to the touch drag input and displays a drawing image according to the touch drag input on the display, at operation S1430.

When the area in which the touch drag input is detected is larger than or equal to the predetermined first threshold at operation S1420, the electronic device 100 determines whether the size of the area in which the touch drag input is detected exceeds the predetermined first threshold and is less than a second threshold, at operation S1440.

As a result of determination, when the size of the touch area in which the touch drag input is detected exceeds the predetermined first threshold and is less than the second threshold, the electronic device 100 performs an eraser function according to the touch drag input, at operation S1450.

When the size of the touch area in which the touch drag input is detected is larger than or equal to the predetermined second threshold at operation S1440, the electronic device 100 performs a function of inserting a predefined image in the display according to the touch drag input, at operation S1460.

When it is determined at operation S1410 that the start point of the touch drag input is positioned within a scroll pad area instead of the second area at operation S1470, the electronic device 100 performs a function of scrolling a plurality of pages according to a touch drag input through the scroll pad at operation S1480.

The aforementioned control method of the electronic device 100 according to various embodiments may be encoded as software and stored in a non-transitory readable medium. The non-transitory readable medium may be installed in various apparatuses.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing embodiments and advantages are merely exemplary and are not to be construed as limiting the present disclosure. The present disclosure can be readily applied to other types of apparatuses. Also, the description of the embodiments of the present disclosure is intended to be illustrative, and not to limit the scope of the claims, and many alternatives, modifications, and variations will be apparent to those skilled in the art.

What is claimed is:

1. A method for controlling an electronic device, the method comprising:
displaying adjacent pages among a plurality of pages, a boundary located between the adjacent pages, a navigation User Interface (UI) including a plurality of items corresponding to the plurality of pages and an indicator displayed on an item corresponding to a page currently displayed on a display among the plurality of items;
based on a touch drag input with a start point positioned outside a predetermined distance from the boundary being received, displaying a drawing corresponding to the touch drag input on the currently displayed page; and
based on the touch drag input with the start point positioned within the predetermined distance from the boundary being received while the drawing is displayed, performing a scroll function to move the plurality of pages and the boundary in a direction corresponding to the touch drag input;
wherein, when the scroll function is performed, the drawing and the boundary are moved together in the direction corresponding to the touch drag input,
wherein, when the scroll function is performed, the indicator is displayed on an item corresponding to another page according to the touch drag input among the plurality of items.

2. The method as claimed in claim 1, wherein the displaying comprises displaying the boundary located between the adjacent pages.

3. The method as claimed in claim 1, wherein the displaying comprises displaying an icon for displaying a navigation window for managing the plurality of pages, and displaying, based on a user input to select the icon, the navigation window in one area of the display together while the plurality of pages are displayed.

4. The method as claimed in claim 3, wherein the navigation window comprises an indicator for managing the plurality of pages currently displayed, and
wherein based on the scroll function being performed, the indicator is moved according to the scroll function performed.

5. The method as claimed in claim 4, wherein the indicator comprises at least one of an icon for moving a page currently displayed, an icon for inserting a new page, and an icon for deleting a page.

6. The method as claimed in claim 3, further comprising:
detecting a rotation of the electronic device while the plurality of pages and the navigation window are simultaneously displayed; and
rotating the navigation window according to the detected rotation of the electronic device while refraining from rotating the plurality of pages.

7. The method as claimed in claim 1, wherein the displaying comprises displaying a scroll pad for scrolling the plurality of pages on a display on which the plurality of pages are displayed, and
scrolling the plurality of pages based on a user command being input through the scroll pad.

8. The method as claimed in claim 1, wherein the performing the drawing further comprises:
identifying a size of an area in which the touch drag input is detected when the start point of the touch drag input is positioned outside the predetermined distance from the boundary located between the adjacent pages; and
performing the drawing function according to the touch drag input when the size of the touch area in which the touch drag input is detected is less than or equal to a first threshold.

9. The method as claimed in claim 8, wherein the performing the drawing further comprises:
performing an eraser function according to the touch drag input when the size of the area in which the touch drag input is detected is greater than the first threshold and less than a second threshold; and
performing an insert function to insert a predefined image when the size of the touch area in which the touch drag input is detected is greater than or equal to the second threshold.

10. An electronic device, comprising:
a display; and
a processor configured to:
control the display to display adjacent pages among a plurality of pages, a boundary located between the adjacent pages, a navigation User Interface (UI) including a plurality of items corresponding to the plurality of pages and an indicator displayed on an item corresponding to a page currently displayed on a display among the plurality of items, based on a touch drag input with a start point positioned outside a predetermined distance from the boundary being received, displaying a drawing corresponding to the touch drag input on the currently displayed page and based on the touch drag input with the start point positioned within the predetermined distance from the boundary being received while the drawing is displayed, perform a scroll function to move the plurality of pages and the boundary in a direction according to the touch drag input, wherein, when the scroll function is performed, the drawing and the boundary are moved together in the direction corresponding to the touch drag input wherein, when the scroll function is performed, the indicator is displayed on an item corresponding to another page according to the touch drag input among the plurality of items.

11. The electronic device as claimed in claim 10, wherein the processor is further configured to control the display to display the boundary located between adjacent pages.

12. The electronic device as claimed in claim 10, wherein the processor is further configured to control the display to display an icon for displaying a navigation window for managing the plurality of pages, and control the display to display, based on a user input to select the icon, the navigation window in one area of the display together while the plurality of pages are displayed.

13. The electronic device as claimed in claim 12, wherein the navigation window includes an indicator for managing the plurality of pages currently displayed, and wherein the processor, based on the scroll function being performed, moves the indicator according to the scroll function performed.

14. The electronic device as claimed in claim 13, wherein the indicator comprises at least one of an icon for moving a page currently displayed, an icon for inserting a new page, and an icon for deleting a page.

15. The electronic device as claimed in claim 12, wherein the processor is further configured to:

detect a rotation of the electronic device while the plurality of pages and the navigation window are simultaneously displayed; and rotate the navigation window according to the detected rotation of the electronic device while refraining from rotating the plurality of pages.

16. The electronic device as claimed in claim 10, wherein the processor is further configured to control the display to display a scroll pad for scrolling the plurality of pages while the plurality of pages are displayed, and scroll the plurality of pages based on a user command being input through the scroll pad.

17. The electronic device as claimed in claim 10, wherein the processor is further configured to:

identify a size of an area in which the touch drag input is detected when the start point of the touch drag input is positioned outside the predetermined distance from the boundary located between the adjacent pages; and perform the drawing function according to the touch drag input when the size of the touch area in which the touch drag input is detected is less than or equal to a first threshold.

18. The electronic device as claimed in claim 17, wherein the processor is further configured to:

perform an eraser function according to the touch drag input when the size of the area in which the touch drag input is detected is greater than the first threshold and less than a second threshold; and perform an insert function to insert a predefined image when the size of the touch area in which the touch drag input is detected is greater than or equal to the second threshold.

19. An electronic board, comprising:

a display; and a processor configured to:

control the display to display adjacent pages among a plurality of pages, a boundary located between the adjacent pages, a navigation User Interface (UI) including a plurality of items corresponding to the plurality of pages and an indicator displayed on an item corresponding to a page currently displayed on a display among the plurality of items;

based on a touch drag input with a start point positioned outside a predetermined distance from the boundary being received, perform a managing function for managing content within the plurality of pages, corresponding to the touch drag input, wherein the managing function is at least one of a drawing function to draw within the plurality of pages, an eraser function to erase within the plurality of pages, and an insert function to insert a predefined image within the plurality of pages; and based on the touch drag input with the start point positioned within the predetermined distance from the boundary being received, perform a scroll function to move the plurality of pages and the boundary in a direction corresponding to the touch drag input, wherein, when the scroll function is performed, a drawing on one of the plurality of pages based on the drawing function and the boundary are moved together in the direction corresponding to the touch drag input, and wherein, when the scroll function is performed, the indicator is displayed on an item corresponding to another page according to the touch drag input among the plurality of items.

20. The method as claimed in claim 1, wherein the performing the scroll function comprises:

scrolling the plurality of pages in a direction perpendicular to the boundary.

* * * * *